US011595316B2

(12) United States Patent
Kumar et al.

(10) Patent No.: US 11,595,316 B2
(45) Date of Patent: Feb. 28, 2023

(54) ADAPTIVE AND SEAMLESS PLAYBACK BUFFER ADJUSTMENT FOR STREAMING CONTENT

(71) Applicant: Apple Inc., Cupertino, CA (US)

(72) Inventors: Aarti Kumar, Los Altos, CA (US); Natalia A. Fornshell, Campbell, CA (US); Suraj Sumangala, Sunnyvale, CA (US); Ahmad Rahmati, Campbell, CA (US)

(73) Assignee: Apple Inc., Cupertino, CA (US)

( * ) Notice: Subject to any disclaimer, the term of this patent is extended or adjusted under 35 U.S.C. 154(b) by 622 days.

(21) Appl. No.: 16/116,010

(22) Filed: Aug. 29, 2018

(65) Prior Publication Data

US 2019/0373032 A1    Dec. 5, 2019

Related U.S. Application Data

(60) Provisional application No. 62/679,656, filed on Jun. 1, 2018.

(51) Int. Cl.
*H04L 47/25* (2022.01)
*H04L 47/2416* (2022.01)
*H04L 65/61* (2022.01)

(52) U.S. Cl.
CPC .......... *H04L 47/25* (2013.01); *H04L 47/2416* (2013.01); *H04L 65/61* (2022.05)

(58) Field of Classification Search
CPC . H04L 47/25; H04L 47/2416; H04L 65/4069; H04L 65/61
See application file for complete search history.

(56) References Cited

U.S. PATENT DOCUMENTS

| 5,825,771 | A  | * | 10/1998 | Cohen ............... H04J 3/0632 370/394 |
| 6,580,694 | B1 | * | 6/2003  | Baker ................ H04L 47/18 370/252 |
| 6,763,274 | B1 | * | 7/2004  | Gilbert ............. G10L 19/005 370/505 |
| 7,162,315 | B2 | * | 1/2007  | Gilbert ............. G10L 19/005 370/505 |
| 8,279,884 | B1 | * | 10/2012 | Narasimha .......... H04L 47/22 370/410 |
| 8,375,137 | B2 | * | 2/2013  | Bowman ............ H04L 69/28 709/219 |

(Continued)

*Primary Examiner* — George C Neurauter, Jr.
(74) *Attorney, Agent, or Firm* — Kilpatrick Townsend & Stockton LLP

(57) ABSTRACT

A source device executing the application can transmit the streaming content to the playback device. The size of the buffer can be changed during the playback of streaming content. To perform the change seamlessly, embodiments can cause the application to provide the streaming content at an increased or decreased rate, depending on how the size of the playback buffer is to be changed. The new buffer size (i.e., smaller or larger amount) can provide improved playback of the streaming content, e.g., based on a latency-reliability tradeoff as determined using various factors (e.g., quality of connection between the devices). The changed rate for providing the streaming content can be achieved by slowing down or speeding up a clock signal that is provided to the application.

21 Claims, 8 Drawing Sheets

(56) References Cited

U.S. PATENT DOCUMENTS

| | | | | |
|---|---|---|---|---|
| 8,472,320 B2* | 6/2013 | Enstrom | | H04L 47/2483 |
| | | | | 370/231 |
| 8,576,884 B2* | 11/2013 | Jougit | | H04J 3/0632 |
| | | | | 370/516 |
| 8,611,337 B2* | 12/2013 | Yadav | | H04L 65/605 |
| | | | | 370/352 |
| 8,855,145 B2* | 10/2014 | Vafin | | H04N 21/44004 |
| | | | | 370/412 |
| 9,313,250 B2* | 4/2016 | Long | | G10H 1/0058 |
| 9,521,057 B2* | 12/2016 | Klingbeil | | H04L 47/2416 |
| 9,634,947 B2* | 4/2017 | Krinsky | | H04L 1/205 |
| 9,660,887 B1* | 5/2017 | Klingbeil | | H04L 47/2416 |
| 9,787,416 B2* | 10/2017 | Shiva | | H04J 3/062 |
| 9,954,919 B1* | 4/2018 | Khan | | G06F 16/9574 |
| 9,997,167 B2* | 6/2018 | Reuschl | | H04J 3/0632 |
| 10,182,022 B2* | 1/2019 | Krinsky | | H04L 1/205 |
| 10,270,703 B2* | 4/2019 | Hammarqvist | | H04L 43/087 |
| 10,432,543 B2* | 10/2019 | Srinivasan | | H04L 47/283 |
| 10,530,826 B2* | 1/2020 | Roncero Izquierdo | | |
| | | | | H04L 47/28 |
| 10,560,393 B2* | 2/2020 | Sun | | H04L 47/283 |
| 2002/0101885 A1* | 8/2002 | Pogrebinsky | | H04J 3/0632 |
| | | | | 370/516 |
| 2005/0058145 A1* | 3/2005 | Florencio | | G10L 19/005 |
| | | | | 370/412 |
| 2007/0263672 A1* | 11/2007 | Ojala | | H04J 3/0632 |
| | | | | 370/516 |
| 2014/0072000 A1* | 3/2014 | Shiva | | H04J 3/062 |
| | | | | 370/516 |
| 2014/0226476 A1* | 8/2014 | Bertze | | H04L 47/30 |
| | | | | 370/230.1 |
| 2014/0310008 A1* | 10/2014 | Kang | | G10L 19/00 |
| | | | | 704/500 |
| 2015/0067186 A1* | 3/2015 | Kuhn | | H04L 47/2416 |
| | | | | 709/231 |
| 2015/0281298 A1* | 10/2015 | Swaminathan | | H04L 65/4084 |
| | | | | 709/231 |
| 2015/0350099 A1* | 12/2015 | Sun | | H04L 47/56 |
| | | | | 370/412 |
| 2016/0105473 A1* | 4/2016 | Klingbeil | | H04L 47/2416 |
| | | | | 370/260 |
| 2016/0248474 A1* | 8/2016 | Gilson | | H04B 3/06 |
| 2017/0125026 A1* | 5/2017 | Lawrence | | H04N 21/42203 |
| 2017/0142535 A1* | 5/2017 | Aggarwal | | H04S 3/008 |
| 2018/0367844 A1* | 12/2018 | Fu | | H04N 21/44004 |
| 2019/0373032 A1* | 12/2019 | Kumar | | H04L 47/25 |

\* cited by examiner

ADAPTIVE AND SEAMLESS PLAYBACK BUFFER ADJUSTMENT FOR STREAMING CONTENT

CROSS-REFERENCES TO RELATED APPLICATIONS

This application claims the benefit of U.S. Provisional Application No. 62/679,656, filed Jun. 1, 2018, entitled "Adaptive And Seamless Playback Buffer Adjustment For Streaming Content." The disclosure of this application is incorporated by reference herein in its entirety.

BACKGROUND

Wireless headsets can play audio streamed from a source device (e.g., a smart phone) over a wireless interface. Variations in packet arrival time (called jitter) can occur because of interference in the wireless channel. This variation could cause the audio packets to arrive sooner or later than when the headset is ready to play the audio packets. Without any mechanism to compensate for this variation, the audio playback may skip or have moments of silence (e.g., glitches). Such problems can occur with other streaming content (e.g., video or haptic data) that may be provided by various applications on the source device.

Such a headset typically has a buffer (also referred to as a jitter buffer) to compensate for this variation, which can allow the streaming audio to play smoothly (e.g., avoiding skipping or moments of silence). Such a buffer does add latency, but provides the benefit of reliability. A tradeoff between latency and reliability exists for selecting a size (or occupancy) of the buffer.

Given that different environments have different connectivity challenges and different applications may have different demands, it can be difficult to determine a single buffer setting that is desirable for all contexts. Further, it is desirable to not affect the playback experience of the user.

BRIEF SUMMARY

To address one or more of the above problems, embodiments can change a size of a buffer of a playback device by changing a rate that an application provides streaming content. For example, a source device executing the application can transmit the streaming content to the playback device. The size of the buffer can be changed during the playback of streaming content. To perform the change seamlessly, embodiments can cause the application to provide the streaming content at an increased or decreased rate, depending on how the size of the playback buffer is to be changed. The new buffer size (i.e., smaller or larger amount) can provide improved playback of the streaming content, e.g., based on a latency-reliability tradeoff as determined using current system properties (e.g., quality of connection between the devices). In some embodiments, the changed rate for providing the streaming content can be achieved by slowing down or speeding up a clock signal that is provided to the application. In this manner, the code for the application does not need to be changed.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

DETAILED DESCRIPTION

Figure 1:
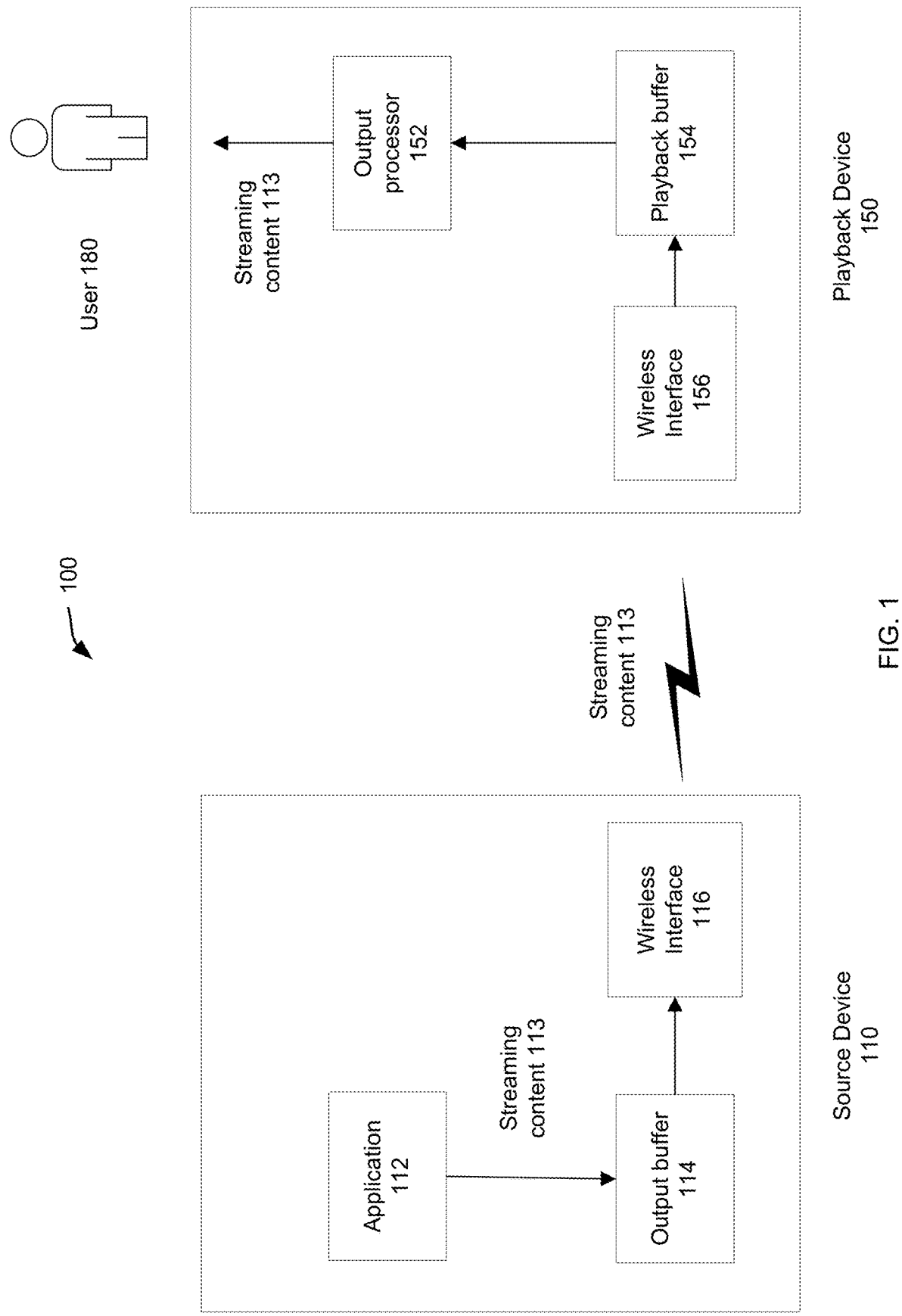
FIG. 1 shows an example playback system between a source device and a playback device that may be improved by embodiments of the present disclosure.

A source device can transmit streaming content to a playback device (e.g., wireless headphones, wireless speakers, etc.), which has a playback buffer. A size of the playback buffer (also referred to as a jitter buffer) of a playback device can be changed during the playback of streaming content generated from an application on a source device. The change in size (i.e., smaller or larger amount) can provide improved playback of the streaming content relative to a previous size. For example, a first size of the playback buffer might cause excessive latency, and a smaller size can provide reduced latency while still providing adequate reliability.

To perform the change seamlessly and on-the fly without any (or with reduced) user-noticeable effect, embodiments can cause the application to provide the streaming content at an increased or decreased rate, depending on how the size of the playback buffer is to be changed. In some embodiments, the changed rate for providing the streaming content can be achieved by slowing down or speeding up a clock signal that is provided to the application. In this manner, the code for the application does not need to be changed.

The desired size of the playback buffer can be determined based on various criteria. For example, the amount of data to be buffered (desired buffer size) can be managed based on the tradeoff between lower latency (i.e., smaller jitter buffer) and link reliability (i.e. larger jitter buffer). Besides this latency-reliability tradeoff, tradeoffs with other technologies (e.g., Bluetooth and WiFi coexistence) can be taken in account. As examples, the determination of an improved or an optimal buffer size for this tradeoff can use a type of source device, a type of streaming application, a type of playback device, a type of streaming content, and current system properties (e.g., connection properties between the devices of a state of the source device, such as whether the user is actively interacting with the source device). The determination can be made by the source device and/or the playback device.

Various types of streaming content may be used, e.g., audio, video, haptics, and the like. Various embodiments can be used with congested or unreliable wired or wireless interfaces (links). In some embodiments, the wireless interface can be Bluetooth Advanced Audio Distribution Profile (A2DP).

I. Jitter Buffers

A jitter buffer of a playback device can correspond to a shared data area where packets are collected, stored, and sent to an output processor (e.g., an audio or video processor) in evenly spaced intervals. Variations in packet arrival time (jitter) can occur for various reasons, e.g., blockages by objects (e.g., a user's body) in the line of sight connection, radiofrequency (RF) interference, network congestion, timing drift, etc. The jitter buffer at a receiving device (e.g., a playback device) can intentionally delay the arriving packets (and potentially reorder them) so that the end user experiences clear playback with very little distortion, e.g., in sound or images.

A static jitter buffer can be hardware-based and configured by the manufacturer. A dynamic jitter buffer can be software-based. Embodiments can employ software-based jitter buffers (or software-based portions of jitter buffers) to change a size of a jitter buffer during playback of streaming content.

A. Example Playback System with Jitter Buffer

FIG. 1 shows an example playback system 100 between a source device and a playback device that may be improved by embodiments of the present disclosure. A source device 110 can provide streaming content to playback device 150, which can then play the streaming content. Examples herein refer to playback of audio, but such examples are equally applicable to other types of streaming content. In some embodiments, source device 110 may be a portable device, e.g., a mobile phone. Playback device 150 may be any suitable device capable of outputting the type of content, e.g., wireless headphones.

Application 112 can provide streaming content 113, e.g., streaming music. Application 112 can be selected by a user, e.g., using a user interface of source device 110. Application 112 can retrieve the content from external sources, e.g., a video/audio server. Application 112 can be configured to provide streaming content 113 at a rate corresponding to a playback time. For example, application 112 can provide one second of audio content for every second of audio that is played by playback device 150.

Source device 110 can include an output buffer 114, which may be a relatively small buffer for feeding data to a network interface, e.g., wireless interface 116. Wireless interface 116 can then transmit the streaming content to wireless interface 156 of playback device 150. This transmission may not be perfectly uniform (e.g., due to interference) and so data packets may not be received in the proper order or always at the same rate. For example, source device 110 may be in a user's back pocket, thereby causing poor communication. Example wireless interfaces include Bluetooth and WiFi, however other interfaces can be implemented.

To address such difficulties in the wireless communication between source device 110 and playback device 150, playback device 150 can include playback buffer 154 that provides streaming content to output processor 152 for playing to a user 180. For example, playback buffer 154 may store 100 milliseconds of data. Thus, if there is RF interference within the environment resulting in no packets being received for 100 milliseconds, playback buffer 154 can still provide the audio to output processor 152 so it can play audio without the user noticing. Typically, jitter buffers are measured in time, but they can also be measured in amount of memory, both of which are examples of sizes of a buffer. Such sizes are the amount of data that is to be stored before sending the data to output processor 152, thereby resulting in latency, but providing reliability.

While encountering transmission problems during streaming the content from source device 110 to playback device 150, the data level in output buffer 114 can momentarily increase due to slow transmission or need for retransmission. In such a case, the data level in playback buffer 134 will momentarily decrease. But, once the communication issue goes away, the two buffers can equilibrate. Such transient changes of transmission data rates can be due to, e.g., RF conditions and/or coexistence with Wi-Fi. These fluctuations in transmission rates are separate from the rate at which application 112 provides streaming content 113, which relates to a sustained transmission rate from source device 110 to playback device 150 over a period of time.

Accordingly, a jitter buffer can temporarily store arriving packets in order to reduce or minimize delay variations. If packets arrive too late, then they may be discarded. A jitter buffer may be misconfigured and be either too large or too small. If a jitter buffer is too small, then an excessive number of packets may be discarded, which can lead to degradation in the playback experience. If a jitter buffer is too large, then the additional delay can lead to excessive latency. Example sizes for a jitter buffer are between 30-300 ms.

Playback buffer 154 can be located in various places of playback device 150. For example, all or a portion of playback buffer 154 can occur in a program stack of a network circuit corresponding to wireless interface 156. As another example, all or a portion of playback buffer 154 can be in another processor (not shown or in output processor 152). The other processor could be an always-on processor of playback device 150 that processes user input.

B. Playback Problems for Variable Jitter Buffer with Streaming Content

It is possible to change a size of a jitter buffer from one connection to another. For example, playback device 150 can change the size of playback buffer 154 depending on the type of source device involved in the connection. For instance, playback device 150 can have a bigger jitter buffer if source device 110 is a watch relative to the settings for a phone. As another example, different source devices can be different vehicles, each of which can result in different buffer sizes for playback buffer 154. In some implementations, vehicles also can be the playback devices and may implement different sized buffers for streaming content received from a source, such as a phone.

Even if the size of a jitter buffer could be changed during a connection, the user experience with the playback could be affected. As an analogy, consider playing a cassette tape. To increase the jitter buffer size, the playback of the tape can be slowed down, but this results in a slower pitch of the audio. Similarly, to decrease the jitter buffer size, the playback of the tape can be sped up, but this would result in higher-pitched audio. Such problems can be specific to streaming content, as intermittent communication (e.g., a phone call) has natural gaps in audio (i.e., when a person stops talking), and thus a user may not notice if the audio was paused so that the buffer can increase in size.

To address such problems in pitch, the playback device could pause the playback of content or skip content, but that does not provide a desirable playback experience. Such a pause can allow for reconfiguring to a different codec and buffer size, but at a cost of user experience.

II. Varying Jitter Buffer with Seamless Playback

Embodiments can change the size of the jitter buffer on the fly while maintaining seamless playback at the playback device. For example, pausing or skipping of content can be avoided, as well as not speeding up or slowing down the playback of the streaming content at the playback device (e.g. no tempo or pitch change).

To maintain continued playback of the content at a normal rate while changing the buffer size, embodiments can cause the application to provide the streaming content at a different rate. For example, the source device can inform the playback device to change the playback buffer size. Then, if the playback buffer is to increase in size (e.g., 150 ms to 250 ms), the application can provide the streaming content at an increased rate for a certain amount of time until the playback buffer reaches the desired size. Then, the application can be controlled back to provide the streaming content at the normal (or previous) rate. Similarly, when the playback buffer is to decrease, the application can provide the streaming data at a lower rate.

A. Controlling Rate of Streaming from Source Device

Some embodiments can induce an application to speed up or slow down its production rate of streaming content. In other embodiments, the source device can provide explicit commands to the application to change the streaming rate. Thus, in order to reduce (increase) the jitter buffer size, instead of speeding up (slowing down) the playback, which can cause audible pitch or tempo variations, embodiments can slow down (speed up) generation of the streaming content at the source device. The source device may or may not provide a command to the playback device to change the size of the playback buffer.

Figure 2:
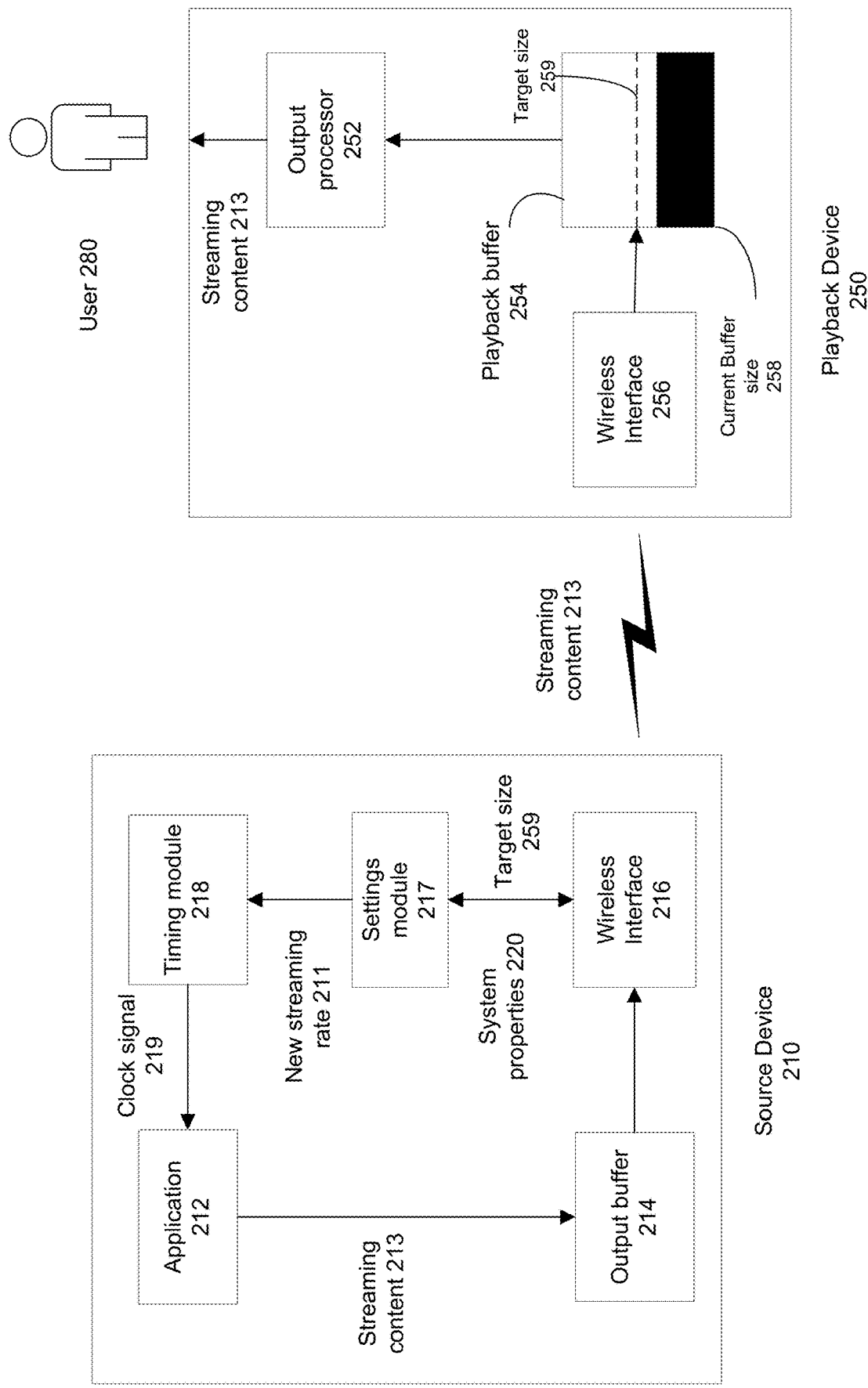
FIG. 2 shows an example playback system between a source device and a playback device according to embodiments of the present disclosure.

FIG. 2 shows an example playback system between a source device and a playback device according to embodiments of the present disclosure. A source device 210 can provide commands to a playback device 250 to update a buffer size and can provide streaming content at a lower/higher rate for a certain amount of time to effectuate the change in buffer size. Aspects of FIG. 2 may be implemented in a similar manner as in FIG. 1.

An application 212 can provide streaming content 213 to an output buffer 214, which in turn provides streaming content 213 to a wireless interface 216. Similar to FIG. 1., a wireless interface 256 can provide the received content to a playback buffer 254. Once the data level in playback buffer 254 reaches the specified size, data packets can be provided to an output processor 252 for playing to a user 280.

Playback buffer 254 can have variable size. As shown, playback buffer 254 has a current buffer size 258 shaded in a dark region. A target size 259 for playback buffer 254 is shown with a dotted line. Thus, in this snapshot in time, the size of playback buffer 254 is increasing. At least a portion of playback buffer 254 is variable to allow for the change in size, e.g., a fixed portion of the buffer can be implemented in hardware and a variable portion can be implemented in software. A size can correspond to an occupancy or fullness of the buffer for providing content to output processor 252, as opposed to a total capacity that the size could be set at.

Settings module 217 can determine one or more new settings for performing the playback of streaming content 213. For example, settings module 217 can determine target size 259 as a new setting. Settings module 217 can determine that a new buffer size is needed based on system properties 220 (e.g., state of the source device, connection properties, and state of the playback device). Settings module 217 can be located in various places within source device 210, e.g., on a wireless chip or in an application processor of source device 210.

Settings module 217 can have logic for determining target size 259 of playback buffer 254. The logic can take into account the trade-off between latency and reliability. The logic can be implemented in various ways, e.g., via deterministic code that specify buffer size for specific values of system properties 220, e.g., as specified in a table or a decision tree to provide discrete changes in values of the buffer size of playback buffer 254. In other examples, a continuous function can provide a continuous change in buffer size relative to one or more system properties. A frequency of updates to the target size can be limited to only when the system properties change significantly (e.g., so updates are not always occurring). A significant change may be determined based on a comparison to a threshold. Such a continuous function can be determined by training a machine learning model.

Once settings module 217 determines target size 259, settings module 217 can inform timing module 218 of the change, e.g., by providing a new streaming rate 211 to timing module 218. Timing module 218 can provide a clock signal 219 to application 212 to cause a change in a rate that application 212 provides streaming content 213. For example, if the size of playback buffer 254 is to increase, clock signal 219 can be increased from a normal rate. And, if the size of playback buffer 254 is to decrease, clock signal 219 can be decreased from a normal rate. In this manner, application 212 can operate in a normal manner, unaware of its change in operation. In other embodiments, application 212 can be programmed to include internal functionality that enables it to change the speed of providing streaming content.

In various embodiments, the communication between source device 210 and playback device 250 may occur via a direct wireless connection (e.g., Bluetooth) or via a wireless local area network (WLAN), e.g., via a WiFi router.

B. Example Changes in Source Rate

A change in the source rate at which streaming content is provided from the application can be used to control the size of the playback buffer in the source device. If the source rate is kept constant, the size of playback buffer will generally stay about the same, with statistical fluctuations due to the transient nature of interference and/or other phenomena that affect the wireless connection. But, if the rate is changed (e.g., by 10%), the size of the playback buffer will increase or decrease at a rate of 10%, while the playback rate stays the same. Such changes in the generation of the streaming content can be done dynamically without the user perceiving it.

1. Reducing Jitter Buffer

Figure 3:
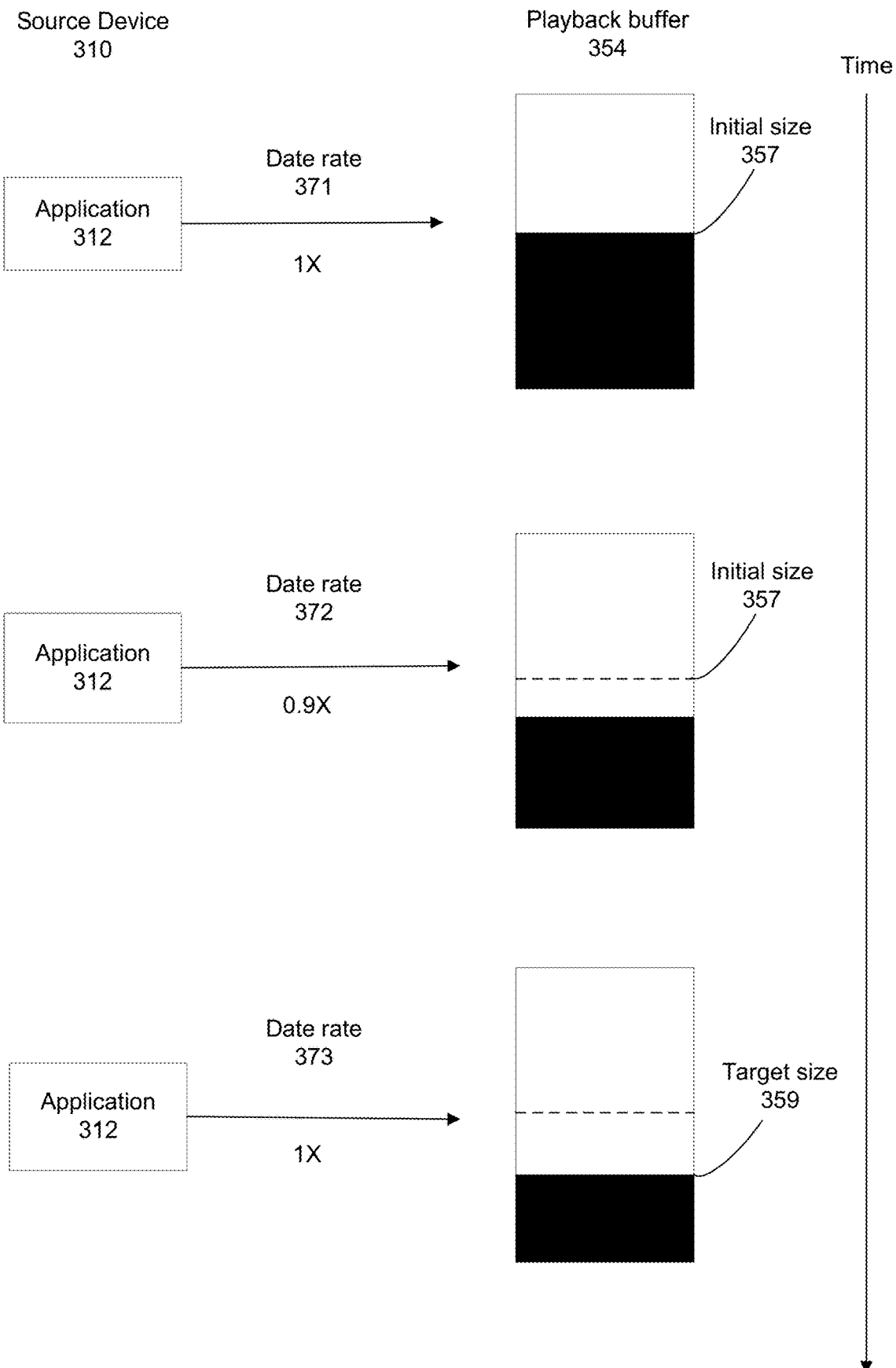
FIG. 3 shows an example for reducing the size of a playback buffer by decreasing a data rate that an application provides streaming content according to embodiments of the present disclosure.

FIG. 3 shows an example for reducing the size of a playback buffer by decreasing a data rate that an application provides streaming content according to embodiments of the present disclosure. Source device 310 includes an application 312 that provides streaming content to a playback device that includes playback buffer 354. Application 312 is shown providing different data rates at different times. Time is shown running downward in FIG. 3.

Initially, application 312 provides streaming content at a data rate 371 that corresponds to the playback rate, as signified by 1×. Thus, the size of playback buffer 354 is roughly constant at an initial size 357.

At some time later, a determination can be made that the size of playback buffer 354 should decrease, e.g. by a settings module of the source device or by the playback device. For instance, a determination can be made to reduce the jitter buffer from 200 ms to 100 ms while playing music. Thus, initially, the streaming content is provided at a data rate 371 to maintain playback buffer 354 at 200 ms. But, once the determination is made to reduce the buffer size, source device 310 can inform the playback device of the new target size of 100 ms, the source rate can change.

To reduce the size of playback buffer 354, application 312 provides the streaming content at a lower data rate 372, e.g., 0.9×. Since the data rate is lower than the playback rate, the amount of data in playback buffer 354 will decrease. Accordingly, source device 310 can temporarily slow down source audio generation rate by 10% for 1 second (i.e. audio player sends 900 ms of audio over 1000 ms). But, the playback device plays 1000 ms of audio over 1000 ms, while only 900 ms audio was provided by the source device. Hence, the fill amount of playback buffer 354 is reduced from 200 to 100 ms. After the 1 second, playback buffer 354 should have the target size of 100 ms.

Once target size 359 is attained, application 312 can revert back to a data rate of 1×, as is shown by data rate 373. Thus, source device 310 can continue to send data at a normal rate in the future, and playback buffer 354 remains at about 100 ms.

2. Increasing Jitter Buffer

Figure 4:
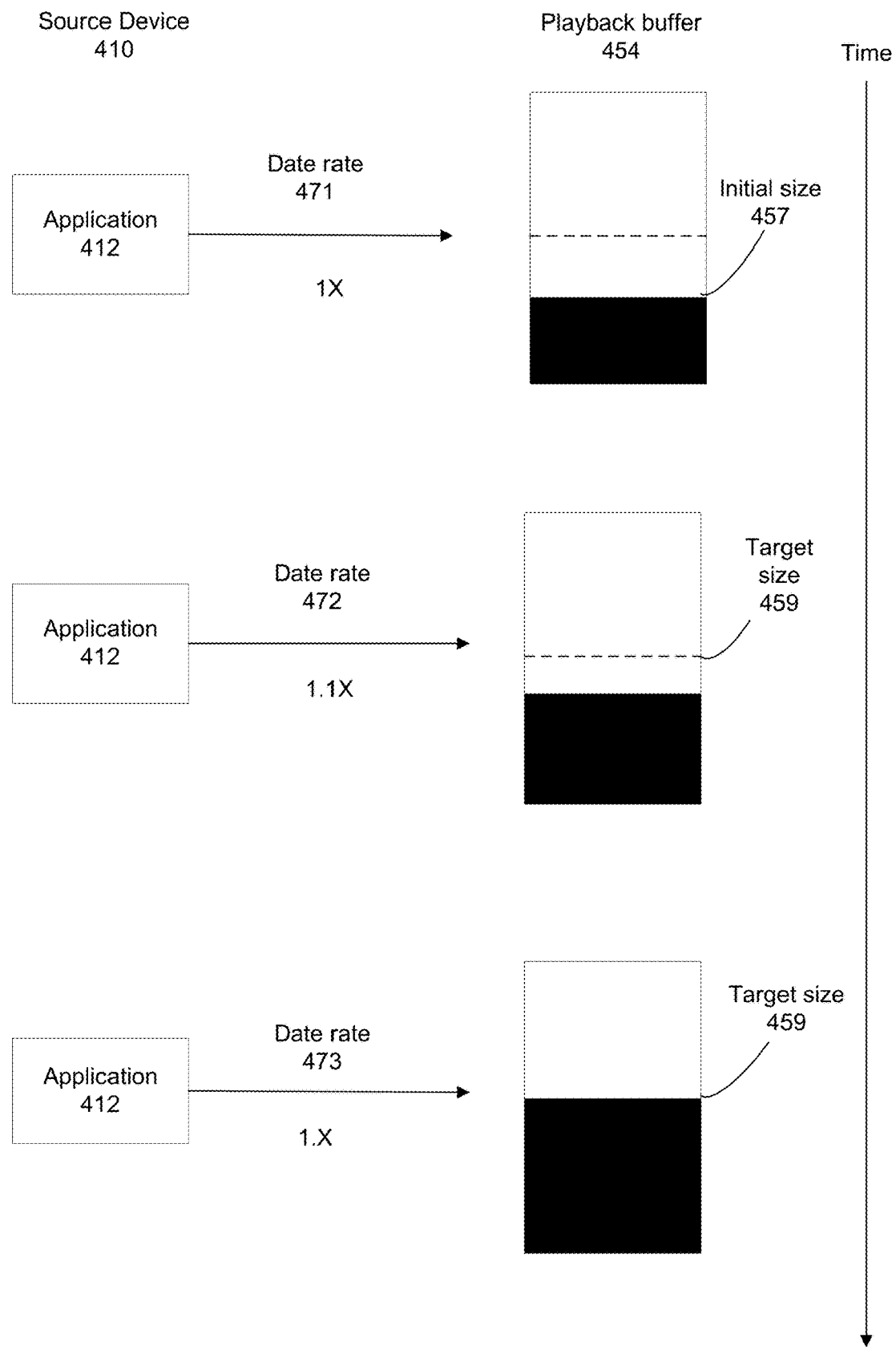
FIG. 4 shows an example for increasing the size of a playback buffer by increasing a data rate that an application provides streaming content according to embodiments of the present disclosure.

FIG. 4 shows an example for increasing the size of a playback buffer by increasing a data rate that an application provides streaming content according to embodiments of the present disclosure. Source device 410 includes an application 412 that provides streaming content to a playback device that includes playback buffer 454. Application 412 is shown providing different data rates at different times. Time is shown running downward in FIG. 4.

Initially, application 412 provides streaming content at a data rate 471 that corresponds to the playback rate, as signified by 1×. Thus, the size of playback buffer 454 is roughly constant at an initial size 457.

At some time later, a determination can be made that the size of playback buffer 454 should increase. As examples, a settings module of the source or the playback device can make the determination. For instance, a determination can be made to increase the jitter buffer from 100 ms to 200 ms while streaming haptic information associated with a user interacting with the source device. Thus, initially, the streaming content is provided a data rate 471 to maintain playback buffer 454 at 100 ms. But, once the determination is made to increase the buffer size, source device 410 can inform the playback device of the new target size of 200 ms.

To increase the size of playback buffer 454, application 412 provides the streaming content at a higher data rate 472, e.g., 1.1×. Since the data rate is higher than the playback rate, the amount of data in playback buffer 454 will increase. As an example, source device 410 can temporarily speed up source audio generation rate by 10% for 1 second (i.e. audio player sends 1100 ms of audio over 1000 ms). But, the playback device plays 1000 ms of audio over 1000 ms, while 1100 ms audio was provided by the source device. Hence, the fill amount of playback buffer 454 is increased from 100 to 200 ms. After the 1 second, playback buffer 454 should have the target size of 200 ms.

Once target size 459 is attained, application 412 can revert back to a data rate of 1×, as is shown by data rate 473. Thus, source device 410 can continue to send data at a normal rate in the future, and playback buffer 454 remains at 200 ms.

In some embodiments, source device 410 can determine that the target size has been reached based on the difference from the initial size and the target size, along with the changed rate (e.g., relative to the standard rate for playback). Given these values are known by the source device, the source device can know the length of time to maintain the changed data rate. In other embodiments, the playback device can periodically provide values for the size of the playback buffer (or an indication that the target size is met), so the source device knows when to revert back to the standard data rate when the target size is reached.

3. Various Rates

In the examples above, the changed data rate was constant over a specified time. But, the changed data need not be constant, and may take various forms.

Figure 5:
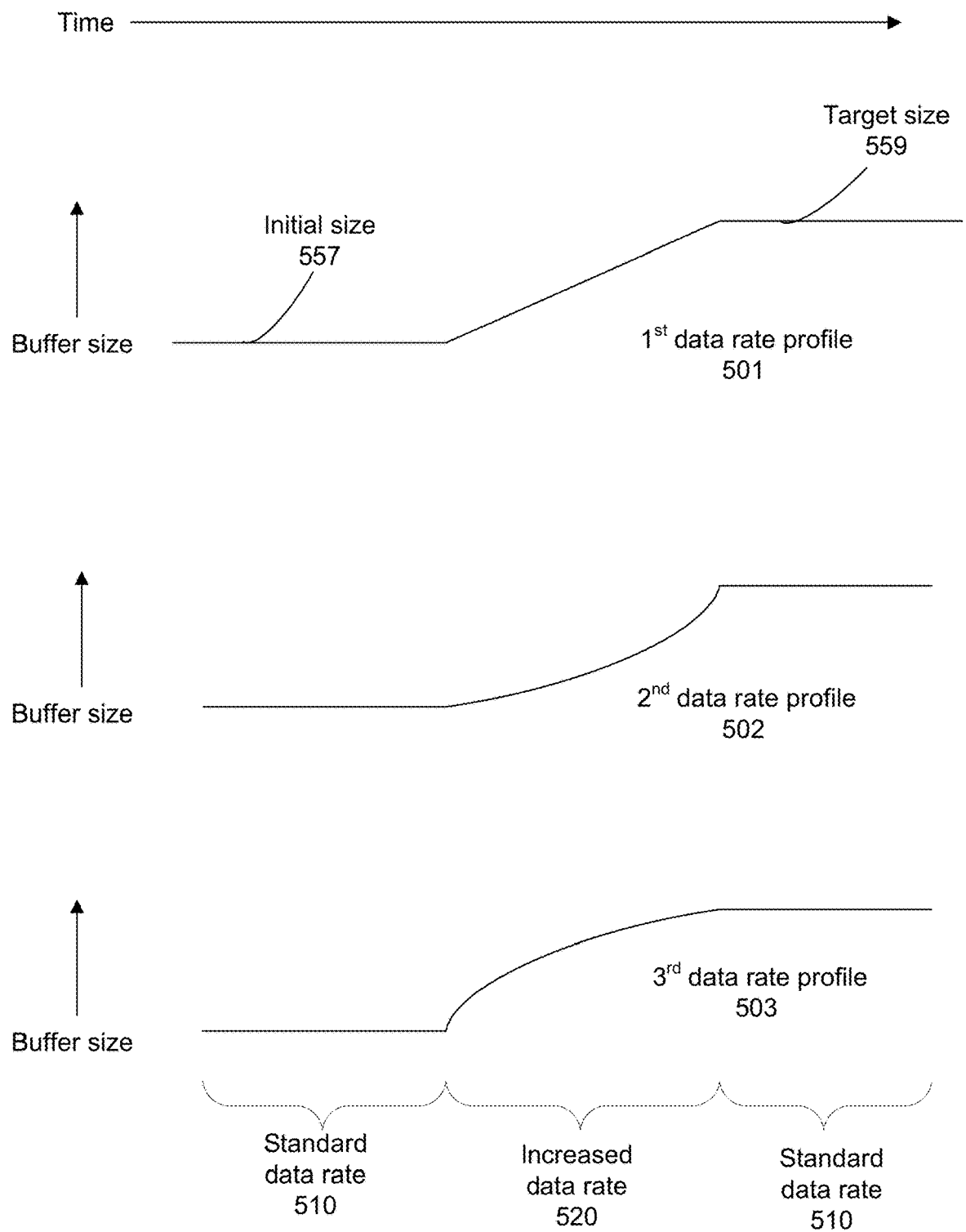
FIG. 5 shows a change in buffer size as a result of various data rate profiles according to embodiments of the present disclosure.

FIG. 5 shows a change in buffer size as a result of various data rate profiles according to embodiments of the present disclosure. The profiles show the change in the playback buffer over time. The profiles start from an initial size 557 to a target size 559. The size of the playback buffer increases upward. Time extends horizontally from left to right.

During a first time period, the standard data rate 510 (i.e., the playback rate) is used for providing the streaming content. During a second time period, an increased data rate 520 is used for providing the streaming content. Once the target size 559 is reached, the standard rate is used. Accordingly, during a third time period, the standard data rate 510 is used for providing the streaming content at a rate that matches the playback rate.

A first data rate profile 501 corresponds to a linear increase in the buffer size, resulting from the streaming rate being a fixed amount higher than the playback rate. This linear increase would result from a constant data rate, e.g., 10% greater than the playback rate. A higher linear rate (e.g., 15%, 20%, 25%, etc.) would result in the target size 559 being reached sooner. If the application is getting data from an external source, there may be a limit of how much faster the streaming rate could be.

A second data rate profile 502 increases slowly, but then accelerates to higher data rates. Once the buffer size reaches the target size, the streaming rate can be abruptly changed from a high rate back to the standard rate.

A third data rate profile 503 starts outs increasing fast, but then the data rate decreases, finally reaching the standard data rate at the end of the second time period. These examples illustrate the various types of changes in data rates that can be used, and is not meant to be exhaustive.

C. Example Communication Flow

Figure 6:
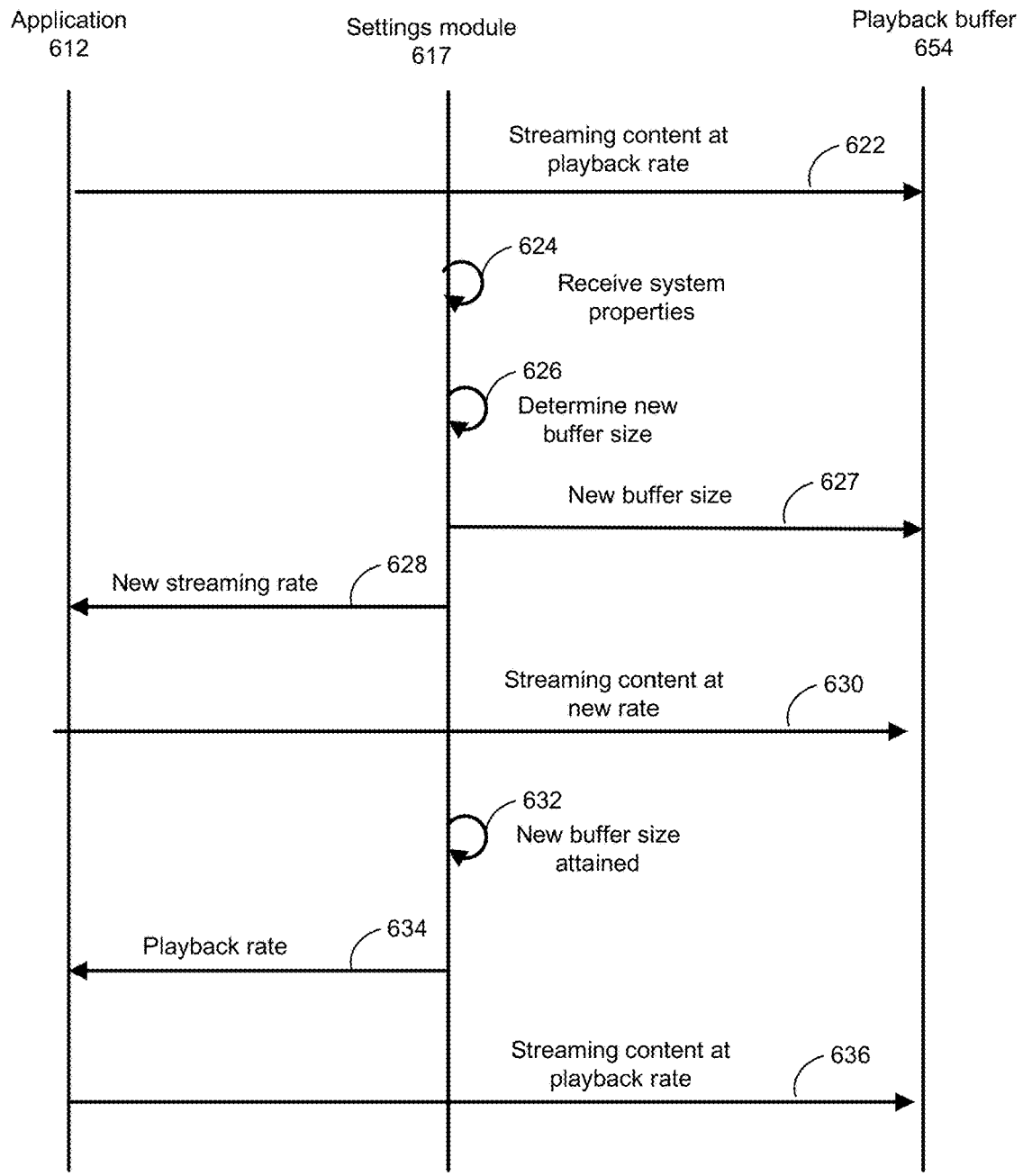
FIG. 6 shows an example sequence diagram for changing a size of a playback buffer while playing streaming content according to embodiments of the present disclosure.

FIG. 6 shows an example sequence diagram 600 for changing a size of a playback buffer while playing streaming content according to embodiments of the present disclosure. In FIG. 6, an application 612 executing on a source device can provide streaming content, which can be buffered at a playback buffer 654 of a playback device. A settings module 617 can determine a new buffer size, as described herein.

At 622, application 612 provides streaming content at a normal playback rate to playback buffer 654. The playback rate corresponds to the rate that the playback device is playing (outputting) the streaming content. Thus, if one streaming content file includes more data per second than another streaming content file (e.g., video vs. audio), then the playback rate would be higher. As the streaming content is provided at the playback rate, the amount of data (data level) in playback buffer 654 stays roughly the same, e.g., fluctuations occurring around an average buffer size (e.g., a first size).

At 624, settings module 617 can receive one or more system properties about the connection between the source device in the playback device. The one or more system properties can be obtained via a pull mechanism (e.g., explicit request) or a push mechanism (e.g., periodically sent from other components or modules). Example system properties include state of the source device (e.g., screen off or on), connection properties, and state of the playback device (e.g., other settings beside buffer size). As to connection properties, the connection can be a wired or wireless connection that can have reliability issues. The connection properties can be received from a network circuit of the source device that provides the connection to the playback device. In some embodiments, settings module 617 can be implemented in such a network circuit.

At 626, settings module 617 determines that playback buffer 654 should have a new buffer size (i.e., a target size). Such a determination can be made based on various factors, e.g., type of source device, the type of application 612 (e.g., music, video, gaming, etc.), type of playback device, type of streaming content, the one or more system properties, and previous measurements and/or settings (e.g., a table specifying preferred buffer sizes). Such a table can include the preferred buffer sizes for the various factors, which can fields of the table. The use of various factors can be optional, e.g., a settings module 617 may not use the connection properties to make a determination for the new buffer size.

At 627, settings module 617 can provide the new buffer size to playback buffer 654, e.g., the new size being 250 ms and the old size being 150 ms. In this manner, playback buffer 654 can expect that the streaming rate will change, and thus not react adversely to this change. Otherwise, the playback device may determine that the connection has severe problems and react to take corrective action. For example, the playback device may be programmed to slow down or speed up the playback based on non-prescribed changes in buffer size, as part of corrective action to maintain the prescribed buffer size. Such a change in playback may only be a few parts per million. But, while such a corrective response may be appropriate for transient changes in the data level of the buffer, such a response would not be appropriate when the size of the buffer is to be changed.

In other embodiments, playback buffer 654 does not receive such an explicit communication, but instead may infer that a new target size is prescribed based on a sustained change in the streaming rate. In one implementation, a linear change or other significant, sustained change in the data level may be identified as corresponding to a prescribed setting made by the source device.

At 628, settings module 617 causes information related to a new streaming rate to be provided to application 612. Such information can be provided directly from settings module 617 or indirectly, e.g., through a timing module as depicted in FIG. 2. For example, settings module 617 can provide an indication that the buffer size is to increase or decrease to a timing module. The timing module can be preconfigured to provide a specified change in data rate (e.g., +/−10%), which can translate into a corresponding change in a clock signal. In other embodiments, settings module 617 can provide a specific amount for the change (e.g., 15% or an absolute data rate) or provide a functional form for how the data rate should change over time. A corresponding clock signal can be determined to change the streaming rate in the specified manner.

At 630, application 612 provides the streaming content at the new rate. In some embodiments, application 612 may be unaware that the streaming rate has changed, e.g., when a received clock signal has changed. As far as application 612 would be concerned, it is still providing the streaming content at the prescribed playback rate, e.g., as set by a user. In other embodiments, application 612 may receive the new streaming rate, change an internal setting, and then provide the streaming content at the new rate.

At 632, settings module 617 can determine that the new buffer size is attained. Such a determination can be performed in various ways. For example, settings module 617 can use a formula: |new size−old size| divided by the change in rate. As another example, settings module 617 can receive information from the playback device about a current data level in playback buffer 654. Settings module 617 can use such periodic measurements to determine when the new buffer size has been attained. As a further example (e.g., when the playback device knows the target size), the playback device can provide a message to the source device that the target size has been attained.

At 634, settings module 617 causes information related to the playback rate to be provided to application 612. Such information can be provided in a similar manner as in 628.

At 636, application 612 provides the streaming content at the playback rate. Since the new buffer size has been attained, it is desirable to provide streaming content at the playback rate to keep the size of playback buffer 654 at the new size. In embodiments where the playback device is not informed explicitly about the new buffer size, the playback device can infer the new setting based on the data level in the buffer staying at the new buffer size over a sufficient period of time, thereby identifying a new normal setting. If a maximum or minimum size is attained, then the playback buffer could perform corrective action at that time, e.g., informing the source device about its capabilities.

D. Use of Clock Signal

A settings module can cause an application, which provides the streaming content, to provide the streaming content at a slower/faster rate. In some embodiments, this change in rate can be accomplished using a changed clock signal provided to the application. Such a change in a clock signal can be used instead of requiring changes in the application, e.g., new requirements or APIs for applications to temporarily slow down or speed up the streaming content.

In embodiments that use a clock signal, a timestamping mechanism "zero-timestamp" can be used. This "zero-timestamp" can be used to synchronize streaming content (e.g., audio) generation with consumption, e.g., through a ring buffer. By slightly shifting the zero-timestamp every cycle, the source application can change its generation rate accordingly.

Accordingly, if the zero-timestamp is shifted by 10% every cycle, then the streaming rate can effectively be changed to 1.1×. In this manner, the application does not know that the streaming rate has changed, since it is still providing a same amount of data per cycle, but the cycles time width has changed, thereby providing a change in the actual data rate provided. For example, if the application knows every second it needs to produce 100 samples, the source device can slow down the clock for the application so instead of producing 100 samples per second, the application would produce 90 samples a second. If the clock was increased, then 110 samples per second could be provided. Thus, a little more data or a little bit less can be output per second by changing the rate of the clock signal that the application uses.

III. Determining Desired Size of Jitter Buffer

Instead of utilizing a fixed jitter buffer length, a size of a playback buffer (e.g., headphones) can change. In various embodiments, a specified number of sizes (e.g., 2, 3, or 4) can be used for particular modes of the current system, or any size in between such specified sizes. The different buffer sizes can corresponds to different modes. The determination of which mode to use can be determined based on various factors as described herein, such as type of application providing the streaming content, type of source device, system properties (e.g., current properties of the connection), and type of playback device.

As an example, different modes resulting in different buffer sizes can include:

A. Low Latency Mode (least delay): A reduced jitter buffer for low latency applications (e.g. games, keyboard clicks);
B. High Latency Mode (highest quality): An enlarged jitter buffer in adverse RF conditions (e.g. interference); and
C. Best Compromise: Any value in between A and B to achieve a desired latency-reliability trade off.

Various factors can be used to determine whether the buffer size should change. The factors can be monitored for changes; and once the changed factors indicate a new buffer size should be used, the source device can implement processes to change the streaming rate. As an example, a retransmission rate could exceed a threshold, thereby indicating that the buffer size should increase to a next level. Generally, the factors can be categorized into device states, application states, and link (connection) states.

One example factor is the type of application providing the streaming content. The application executing on the source device can be categorized, e.g., based on metadata associated with the application. Such metadata can be stored at a server from which the application is downloaded, or an application can provide information (e.g., a flag) specifying a preferred number or category of buffer size. In another example, the application could specify a preferred buffer size, e.g., based on current system properties.

The different types of applications can correspond to different levels of tradeoff between low and high latency. A music category can preferentially have a high latency mode, since high fidelity playback is more critical. A gaming category can preferentially have a high latency mode, since a quick response is more critical. An in-between setting can correspond to games that are in the foreground, but do not want to mix background sounds. An application focused on using voice commands (e.g., enabling blind users) can preferentially have the high stability of a higher jitter buffer; such voice commands can allow usage of auxiliary features and a soft keyboard. By having a preferential setting, one category of applications would tend to have higher/lower buffer sizes than applications of another category, e.g., for the same system properties.

Another example factor is RF conditions. For example, a connection to the network may be very good, but the connection from the source device (e.g., a phone) to the playback device (e.g., Bluetooth headset) may be bad. Such a determination of a quality of a connection can be determined by round trip signaling. Other measurements of a quality of a connection can include received signal strength indicator (RSSI), retransmission rate, noise, interference, and signal-to-interference-plus-noise ratio (SINR).

Other example factors further include an operating state of the source device, e.g., whether the user is actively using a user interface (e.g., a screen is "on" to a screen is "off"). A proximity of the two devices to each other can be measured, e.g., via round trip timing of specific communications used for such measurements. Another system property could be a location of the source device, e.g., in a pocket. Such a location can be determined using sensor(s) of the source device, e.g., a light sensor can detect ambient light, where a dark measurement can indicate being in a pocket. If the user is not actively using the source device, then higher latency is likely tolerable. Other sensor(s) can also be used, e.g., an accelerometer and a gyrometer, which can be used to determine various motion states of the user, e.g., running, walking, or driving. A location of the source device relative to the playback device can also be used.

Such factors can be used to make an initial determination of what size the buffer should be set. But, if one or more of the factors change, such a change can be identified as an event that requires re-evaluation of the setting for buffer size. The current system properties (i.e., after a change) can indicate that a new buffer size is to be used. Besides being dependent on a new system property, such a change can depend on what the other system properties are (i.e., the ones that have not changed). For example, the new buffer size can depend on whether the application is for gaming or music, even though the type of application did not change. For the same connection properties, a gaming application would tend to have a smaller jitter buffer than a music application. Thus, if the connection degraded, the buffer size may increase, but the target size can be different depending on the type of application.

The selection of the new buffer size can be implemented in various ways. For example, a table can include various fields (e.g., categorical or numerical), where the current system properties can match to a particular row that has a specified value for the buffer size. Thus, a given configuration of N factors (criteria) can specify a particular buffer size to use. Other mechanisms can be used besides a table. For example, a decision tree can use the current values for the factors to ultimately select the buffer size at the end of the tree. Other machine learning models besides a decision tree can be used, e.g., a neural network or linear regression. The machine learning model can be trained in different conditions (e.g., different system properties and different states of the devices) with different buffer sizes to determine optimal settings for the buffer sizes at different conditions. The specified buffer sizes could can change discretely or continuously for given changes in the conditions (properties).

Example factors that indicate a benefit from a reduced playback latency can include screen on/off status, user interaction (e.g. with physical or touchscreen buttons), whether the application is running in the foreground, use of an accessibility mode for users that are visually impaired, audio block size chosen by an application as a proxy for latency requirements, audio mode chosen by an application, or other specific system APIs for applications to directly communicate their intent and/or requirements regarding playback latency. For example, if a user is running and listening to music with the screen off, low latency is likely not required.

Certain link conditions may require a larger jitter buffer in order to maintain QoS (Quality of Service, e.g. glitch rate) to the user. Example link conditions include retransmission rate and other radio usage and channels, e.g., WiFi and LTE when Bluetooth is used for the connection to the playback device. The determination of whether to use a larger size can depend on the current data level in the jitter buffer, e.g., the amount of the jitter buffer actually being used. The source device can obtain this amount in various ways, e.g., either reported by the playback device or calculated as the time difference between sending a packet to a network controller and receiving the corresponding completed packet event.

The logic for determining the new buffer size can be the same across a group of devices or can be specific to a particular device. For example, the source device can perform measurements of the performance of different buffer sizes in conjunction with various configurations of system properties at the time of the measurements. In this manner, unique default settings can be determined per device, and even per user, if multiple users use a device. And, the specific buffer sizes to use for different conditions can be optimized for a particular device. Further details for such a personalization for the selection of a buffer size can be found in U.S. nonprovisional application Ser. No. 16/107,934 entitled "Individualized Adaptive Wireless Parameter Tuning For Streaming Content" by Rahmati et al., filed Aug. 21, 2018, the disclosure of which is incorporated by reference in its entirety for all purposes.

Besides selecting a better buffer size, various settings can be selected to improve the latency-reliability tradeoff as well as tradeoffs with other technologies (e.g. BT-WiFi coexistence). The settings may be selected for a particular application, type of streaming content, type of wireless interface, and type of playback device (e.g., headphones). Example settings are provided for the use case of playing audio over Bluetooth using Advanced Audio Distribution Profile (A2DP). A low latency codec (e.g. AAC-ELD or SBC) can be used instead of higher quality codecs (e.g., AAC-LC). A2DP packets can be prioritized over the Bluetooth link vs. other Bluetooth packets and over the WiFi link when using smaller jitter buffers. Shorter and/or lower data rate Bluetooth packets can be used for improved reliability, lower latency, and improved coexistence with other radios, e.g. WiFi. The number of codec frames per Bluetooth packet can be changed dynamically to optimize performance and latency. The codec bitrate can be changed dynamically to optimally fill different types of Bluetooth packets being used.

IV. Flowchart

Figure 7:
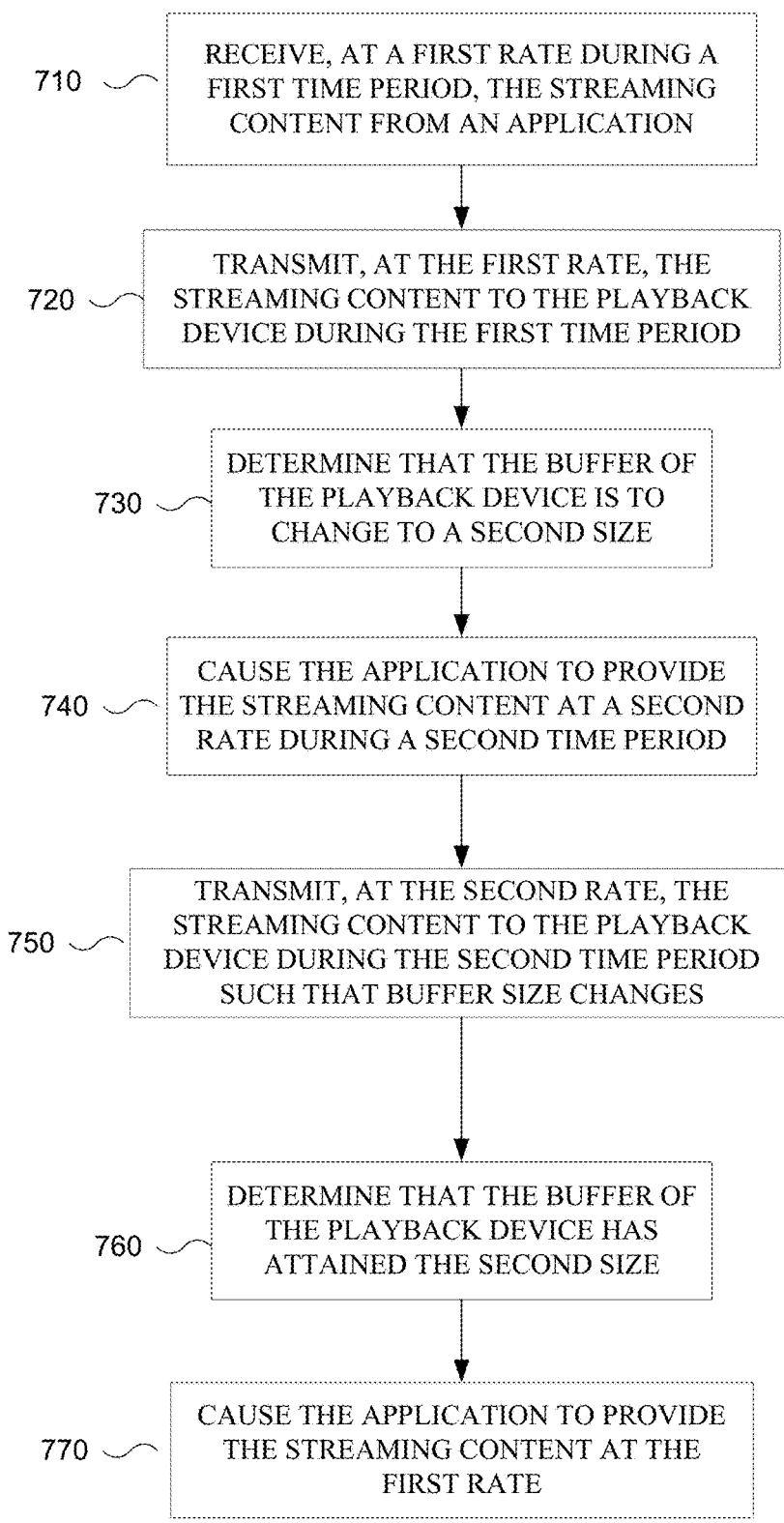
FIG. 7 is a flowchart illustrating a method of using a source device for facilitating playback of streaming content at a playback device according to embodiments of the present disclosure.

FIG. 7 is a flowchart illustrating a method 700 of using a source device for facilitating playback of streaming content at a playback device according to embodiments of the present disclosure. The playback device may be in wireless communication with the source device. Method 700 can be performed by the source device, e.g., source device 210. The source device may be a portable device.

At block 710, the streaming content is received from an application executing on a processor of the source device. The application can begin providing the streaming content at a first rate, e.g., during a first time period. The first rate can correspond to a rate of playback at the playback device, e.g., as specified by the content file. The streaming data can be received by system software to enable transmission to the playback device.

At block 720, the streaming content is transmitted to the playback device during the first time period. The streaming content can be transmitted at the first rate over a wireless interface. The playback device can include a buffer configured to store the transmitted streaming content before being played at the playback device. A latency can exist as a result of such buffering, but more reliable playback can result. During the first time period, the buffer can have a first size, which can later be changed.

At block 730, it can be determined that the buffer of the playback device is to change to a second size. This determination can be performed by a settings module, e.g., settings module 217 of FIG. 2. In other embodiments, the playback device can determine the buffer size is to change and communicate the change to the source device, where the source device would effectively make the determination as a result of receiving the message about the change from the playback device.

The determination that the buffer size needs to change can be based on various factors, e.g., as described herein. For example, certain system properties (e.g., connection properties) may change from when the streaming started. The source device can periodically check the system properties and determine that the optimal buffer size for the current streaming operation is not the first size any more. Such a determination can be made as part of a different latency-reliability tradeoff for the particular configuration, e.g., type of application, type of streaming content, type of playback device, type of source device, and other mentioned herein.

In other examples, a state of the source device and/or the playback device may change. Accordingly, the determination that the buffer of the playback device is to change can includes receiving a change in a state of the source device, a state of the playback device, or a connection property of a connection between the source device and the playback device. An example change is in the state of the source device, where the change is a display screen of the source device transitioning between 'on' and 'off'. The change can be provided as a push or a pull communication, e.g., to a settings module. The second size can then be determined based at least on the change. For example, the new conditions can be used to look up the corresponding size for those conditions, and the specific size can be different than the first size.

The second size can be further determine based on one or more system properties that have not changed. For example, the one or more system properties that have not changed can include one or more of a type of the application, the type of data streaming, a type of the source device, and a type of the playback device. The values can be fields in a table, and thus used to select the current buffer size to use. In embodiments where the source device determines the second size, the source device can provide the second size to the playback device.

At block 740, the source device (e.g., a settings module) can cause the application to provide the streaming content at a second rate that is different than the first rate. When the second size is larger than the first size, the second rate can be higher than the first rate. When the second size is smaller than the first size, the second rate can be lower than the first rate.

This new streaming rate can occur during a second time period. Thus, the streaming content can initially be provided at a first rate, and then after a decision to change the rate, the application can provide the streaming data at the second rate (e.g., at a higher or lower rate). The source device can cause the application to change the streaming rate in various ways, e.g., using a sped up or slowed down clock signal or by providing instructions to the application. The second rate may stay the same or change during the second period until the buffer reaches the second size.

At block 750, the streaming content is transmitted (e.g., over a wireless interface) at the second rate to the playback device during the second time period. Given the second rate is different than the first rate, the size of the buffer of the playback device can change. For instance, if the playback rate stays the same, the amount of data in the buffer will increase or decrease as the transmission rate from the source device changes.

At block 760, the source device can determine that the buffer of the playback device has attained the second size. The determination can be performed in various ways, as is described herein. For example, the source device (e.g., via a settings module) can determine the amount of time to reach the target size of the buffer based on the difference between the first size and the second size and how much the second rate differs from the first rate. Thus, the source device may not need any feedback from the playback device to determine the buffer has reached the second size. But, in some embodiments, the playback can provide such feedback, as is described herein.

For example, the second rate can differ from the first rate by a specified percentage. The source device can determine that the buffer of the playback device has attained the second size using the specified percentage and a difference between the first size and the second size. Examples of such a formula are provided herein.

At block 770, the source device can cause the application to provide the streaming content at the first rate, e.g., after determining that the buffer attained the second size. By returning to the first rate, the buffer size can be maintained at the second size, at least until a determining is made to change the buffer size again. Thus, such a process may be performed multiple times during a streaming session.

Embodiments can also be used where the receiving device consumes the streaming content, but does not play it. For example, an application at the receiving device can process the incoming streaming data, e.g., storing or modifying the data. The data may be transmitted to other devices or just stored at the receiving device for later use or retrieval. The processing rate can be constrained in a similar manner as the playback rate.

V. Example Device

Figure 8:
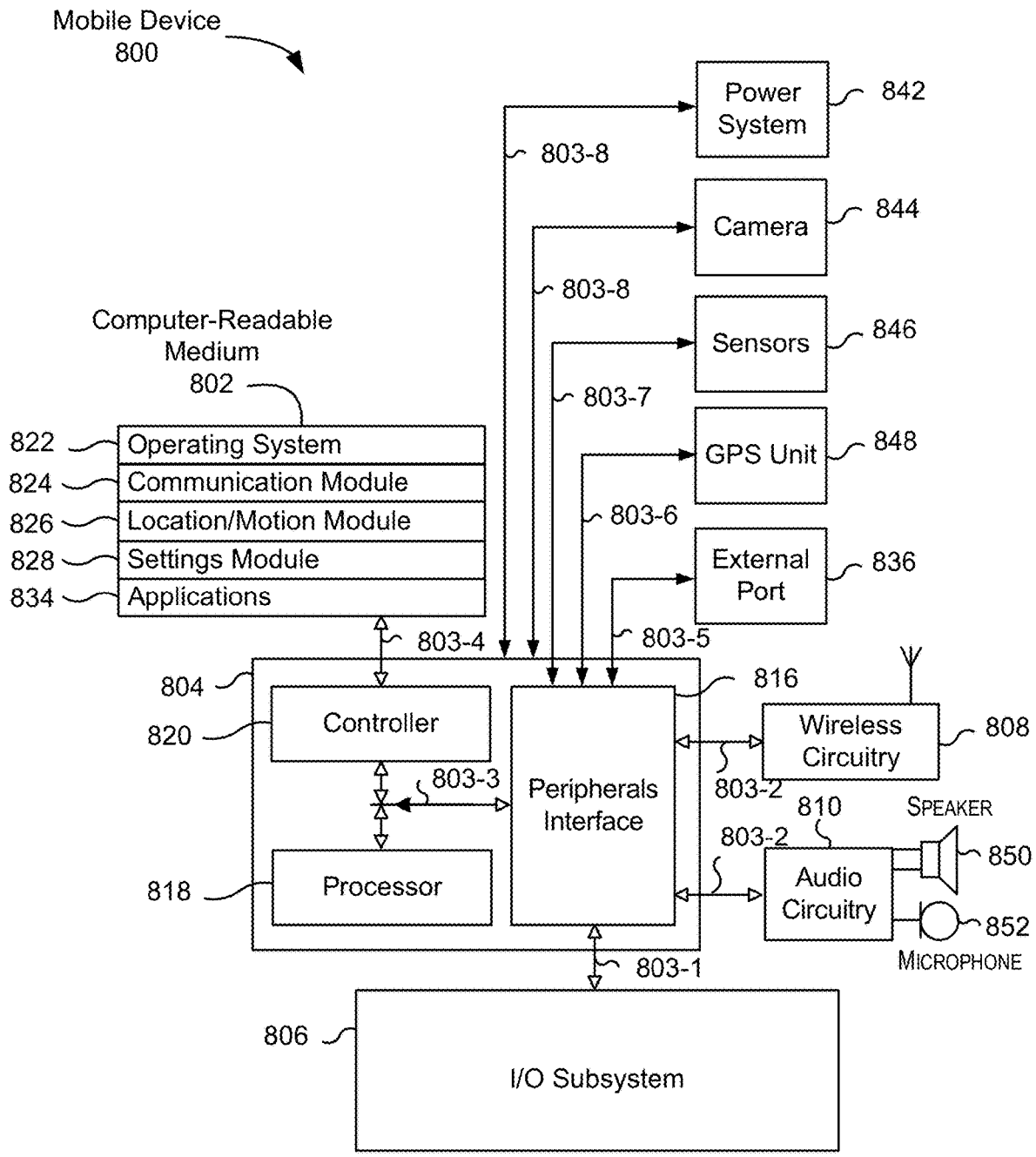
FIG. 8 is a block diagram of an example electronic device.

FIG. 8 is a block diagram of an example electronic device 800. Device 800 generally includes computer-readable medium 802, a processing system 804, an Input/Output (I/O) subsystem 806, wireless circuitry 808, and audio circuitry 810 including speaker 812 and microphone 814. These components may be coupled by one or more communication buses or signal lines 803. Device 800 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a headset, or the like, including a combination of two or more of these items.

It should be apparent that the architecture shown in FIG. 8 is only one example of an architecture for device 800, and that device 800 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 808 can use various protocols, e.g., as described herein. In various embodiments, wireless circuitry 808 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 808 is coupled to processing system 804 via peripherals interface 816. Peripherals interface 816 can include conventional components for establishing and maintaining communication between peripherals and processing system 804. Voice and data information received by wireless circuitry 808 (e.g., in speech recognition or voice command applications) is sent to one or more processors 818 via peripherals interface 816. One or more processors 818 are configurable to process various data formats for one or more application programs 834 stored on medium 802.

Peripherals interface 816 couple the input and output peripherals of device 800 to the one or more processors 818 and computer-readable medium 802. One or more processors 818 communicate with computer-readable medium 802 via a controller 820. Computer-readable medium 802 can be any device or medium that can store code and/or data for use by one or more processors 818. Computer-readable medium 802 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 816, one or more processors 818, and controller 820 can be implemented on a single chip, such as processing system 804. In some other embodiments, they can be implemented on separate chips.

Processor(s) 818 can include hardware and/or software elements that perform one or more processing functions, such as mathematical operations, logical operations, data manipulation operations, data transfer operations, controlling the reception of user input, controlling output of information to users, or the like. Processor(s) 818 can be embodied as one or more hardware processors, microprocessors, microcontrollers, field programmable gate arrays (FPGAs), application-specified integrated circuits (ASICs), or the like.

Device 800 also includes a power system 842 for powering the various hardware components. Power system 842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 800 includes a camera 844. In some embodiments, device 800 includes sensors 846. Sensors can include accelerometers, compass, gyrometer, pressure sensors, audio sensors, light sensors, barometers, and the like. Sensors 846 can be used to sense location aspects, such as auditory or light signatures of a location.

In some embodiments, device 800 can include a GPS receiver, sometimes referred to as a GPS unit 848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for device 800. In some embodiments, the software components include an operating system 822, a communication module 824 (or set of instructions), a location module 826 (or set of instructions), a settings module 828 that is used as part of determining settings (e.g., a playback buffer size) described herein, and other application programs 834 (or set of instructions).

Operating system 822 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 824 facilitates communication with other devices over one or more external ports 836 or via wireless circuitry 808 and includes various software components for handling data received from wireless circuitry 808 and/or external port 836. External port 836 (e.g., USB, FireWire, Lightning connector, 60-pin connector, etc.) is adapted for coupling directly to other devices or indirectly over a network (e.g., the Internet, wireless LAN, etc.).

Location/motion module 826 can assist in determining the current position (e.g., coordinates or other geographic location identifiers) and motion of device 1300. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 800 based on the position coordinates of the corresponding transmitters. Regardless of the specific location technology used, location/motion module 826 receives information from which a location fix can be derived, interprets that information, and returns location information, such as geographic coordinates, latitude/longitude, or other location fix data A settings module 828 can determine settings of mobile device 800 and/or of other devices (e.g., a playback device) in communication with device 800. For example, settings module 828 can determine a buffer size of a playback (jitter) buffer of a playback device. Settings module 828 can make the determination based on information obtained from other components of device 800, e.g., from wireless circuitry 808, which may correspond to a wireless interface. Settings module 828 can communicate with various application programs 834, e.g., ones that provide streaming content. For example, settings module 828 can cause a change in a rate that streamlining content is provide from an application. In some embodiments, settings module 828 can also include a timing module or cause a timing module to provide a sped up or slowed down clock signal to a streaming application.

The one or more applications 834 on device 800 can include any applications installed on the device 800, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 806 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or trackpad. In some embodiments, I/O subsystem 806 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 806 can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the present disclosure has been described with respect to specific embodiments, it will be appreciated that the disclosure is intended to cover all modifications and equivalents within the scope of the following claims.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A method of using a source device for facilitating playback of streaming content at a playback device that is in wireless communication with the source device, the method comprising performing, at the source device:
    receiving, at a first rate during a first time period, the streaming content from an application executing on a processor of the source device;
    transmitting, at the first rate over a wireless interface, the streaming content from the application to the playback device during the first time period, the playback device including a buffer configured to store the transmitted streaming content before being played at the playback device, wherein the buffer has a first size during the first time period;
    determining that the buffer of the playback device is to change to a second size;
    in response to determining that the buffer of the playback device is to change to the second size, during a second time period, causing the application to provide the streaming content at a second rate that is different than the first rate; and
    transmitting, at the second rate over the wireless interface, the streaming content from the application to the playback device during the second time period such that a size of the buffer of the playback device changes from the first size to the second size.

2. The method of claim 1, further comprising:
    determining that the buffer of the playback device has attained the second size; and
    after determining that the buffer attained the second size, causing the application to provide the streaming content at the first rate.

3. The method of claim 2, wherein the second rate differs from the first rate by a specified percentage, and wherein determining that the buffer of the playback device has attained the second size uses the specified percentage and a difference between the first size and the second size.

4. The method of claim 1, wherein causing the application to provide the streaming content at the second rate includes changing a clock signal provided to the application.

5. The method of claim 1, wherein the second size is larger than the first size and the second rate is higher than the first rate.

6. The method of claim 1, wherein determining that the buffer of the playback device is to change includes:

receiving a change in a state of the source device, a state of the playback device, or a connection property of a connection between the source device and the playback device; and determining the second size based at least on the change.

7. The method of claim 6, wherein the second size is further determined based on one or more system properties that have not changed.

8. The method of claim 7, wherein the one or more system properties that have not changed include a type of the application.

9. The method of claim 6, wherein the change is in the state of the source device, and wherein the change is a display screen of the source device transitioning between 'on' and 'off'.

10. The method of claim 1, further comprising:
providing the second size to the playback device.

11. The method according to claim 1, wherein the second size is smaller than the first size and the second rate is lower than the first rate.

12. The method according to claim 1, wherein the size of the buffer represents an occupancy of the buffer.

13. A computer product comprising a non-transitory computer-readable medium storing instructions that when executed control a source device to facilitate playback of streaming content at a playback device that is in wireless communication with the source device, the instructions causing the source device to perform:

receiving, at a first rate during a first time period, the streaming content from an application executing on a processor of the source device;

transmitting, at the first rate over a wireless interface, the streaming content from the application to the playback device during the first time period, the playback device including a buffer configured to store the transmitted streaming content before being played at the playback device, wherein the buffer has a first size during the first time period;

determining that the buffer of the playback device is to change to a second size;

in response to determining that the buffer of the playback device is to change to the second size, during a second time period, causing the application to provide the streaming content at a second rate that is different than the first rate; and transmitting, at the second rate over the wireless interface, the streaming content from the application to the playback device during the second time period such that a size of the buffer of the playback device changes from the first size to the second size.

14. The computer product of claim 13, wherein the instructions further cause the source device to perform:
determining that the buffer of the playback device has attained the second size; and
after determining that the buffer attained the second size, causing the application to provide the streaming content at the first rate.

15. The computer product of claim 13, wherein causing the application to provide the streaming content at the second rate includes changing a clock signal provided to the application.

16. The computer product of claim 13, wherein determining that the buffer of the playback device is to change includes:
receiving a change in a state of the source device, a state of the playback device, or a connection property of a connection between the source device and the playback device; and
determining the second size based at least on the change.

17. The computer product of claim 13, wherein the instructions further cause the source device to perform:
providing the second size to the playback device.

18. A source device for facilitating playback of streaming content at a playback device that is in wireless communication with the source device, the source device comprising one or more processors configured to:

receive, at a first rate during a first time period, the streaming content from an application executing on a processor of the source device;

transmit, at the first rate over a wireless interface, the streaming content from the application to the playback device during the first time period, the playback device including a buffer configured to store the transmitted streaming content before being played at the playback device, wherein the buffer has a first size during the first time period;

determine that the buffer of the playback device is to change to a second size;

in response to determining that the buffer of the playback device is to change to the second size, during a second time period, causing the application to provide the streaming content at a second rate that is different than the first rate; and transmit, at the second rate over the wireless interface, the streaming content from the application to the playback device during the second time period such that a size of the buffer of the playback device changes from the first size to the second size.

19. The source device of claim 18, wherein the one or more processors are further configured to:
determine that the buffer of the playback device has attained the second size; and
after determining that the buffer attained the second size, cause the application to provide the streaming content at the first rate.

20. The source device of claim 18, wherein causing the application to provide the streaming content at the second rate includes changing a clock signal provided to the application.

21. The source device of claim 18, wherein the one or more processors are further configured to:
provide the second size to the playback device.

* * * * *